United States Patent [19]
Fix et al.

[11] Patent Number: 5,714,193
[45] Date of Patent: Feb. 3, 1998

[54] ADDING OIL TO NUT PASTE PRIOR TO HOMOGENIZATION TO REDUCE VISCOSITY AND STICKINESS WITHOUT LOSS OF NUT FLAVOR

[75] Inventors: Deborah Kelley Fix, Maineville; Richard Joseph Sackenheim; Vincent York-Leung Wong, both of Hamilton, all of Ohio

[73] Assignee: The Procter & Gamble Co., Cincinnati, Ohio

[21] Appl. No.: 708,530

[22] Filed: Sep. 5, 1996

[51] Int. Cl.⁶ ............................................. A23L 1/38
[52] U.S. Cl. ........................ 426/633; 426/519; 426/613
[58] Field of Search ............................. 426/633, 519, 426/613

[56] References Cited

U.S. PATENT DOCUMENTS

| | | | |
|---|---|---|---|
| 3,317,325 | 5/1967 | Durst | 99/126 |
| 3,619,207 | 11/1971 | Dzurik et al. | 99/128 |
| 4,000,322 | 12/1976 | Billerbeck et al. | 426/72 |
| 4,004,037 | 1/1977 | Connick | 426/324 |
| 4,273,795 | 6/1981 | Bosco et al. | 426/602 |
| 4,329,375 | 5/1982 | Holloway, Jr. et al. | 426/632 |
| 4,814,195 | 3/1989 | Yokoyama et al. | 426/633 |
| 4,828,868 | 5/1989 | Lasdon et al. | 426/633 |
| 5,079,027 | 1/1992 | Wong et al. | 426/633 |
| 5,230,919 | 7/1993 | Walling et al. | 426/633 |
| 5,433,970 | 7/1995 | Wong et al. | 426/633 |
| 5,490,999 | 2/1996 | Villagran et al. | 426/63 |
| 5,508,057 | 4/1996 | Wong et al. | 426/633 |
| 5,518,755 | 5/1996 | Wong et al. | 426/633 |

*Primary Examiner*—Helen Pratt
*Attorney, Agent, or Firm*—Eric W. Guttag

[57] ABSTRACT

Nut spreads, especially peanut butters, having a relatively low viscosity of about 2000 centipoise or less that have significantly reduced stickiness, yet maintain desired nut flavor intensity. These nut spreads are obtained by high shear mixing a mixture of nut paste, added oil, plus any other nut spread ingredients such as salt, sugar, nut butter stabilizer and emulsifier, to reduce the viscosity of the spread to about 2000 centipoise or less.

8 Claims, No Drawings

ADDING OIL TO NUT PASTE PRIOR TO HOMOGENIZATION TO REDUCE VISCOSITY AND STICKINESS WITHOUT LOSS OF NUT FLAVOR

TECHNICAL FIELD

This application relates to nut butters, especially peanut butters, having reduced stickiness. This application particularly relates to nut butters, especially peanut butter, having reduced stickiness without loss of desired nut flavors.

BACKGROUND OF THE INVENTION

Conventional peanut butter and other nut butters typically comprise cohesive, comminuted mixtures of solid nut particles suspended in oil (nut paste), a sweetener such as sugar, high fructose corn syrup or honey, salt and a stabilizing agent (e.g., a high melting point fat or hardstock) to prevent separation of the oil and particulates. The primary component of peanut butter, peanut paste, is formed by roasting, blanching, and grinding shelled peanuts. During the grinding step, the cellular structure of the peanuts is ruptured, releasing the peanut oil in which the pulverized peanut solids become suspended.

There are a number of factors that consumers consider in evaluating the desirability of peanut butter. One is its "stickiness" perception. The consumer perceives "stickiness" as the adhesion to the roof of the mouth of the mass of ingested peanut butter, as well as the effort it takes for the tongue to remove it therefrom. However, what the consumer senses as "stickiness" is not due primarily to adhesive forces, but instead to the cohesiveness of the mass of peanut butter as it is worked on jointly by chemical (saliva) and physical (tongue) forces in the mouth. Indeed, "stickiness" decreases as the saliva and tongue reduces the viscosity of this mass of peanut butter to the point that it can be easily swallowed.

Another factor considered by consumers is "peanut flavor" perception. The mechanism by which peanut flavor is released is believed to be due to the hydration of the nut solids in the mouth by saliva. While the total amount of peanut flavor present in the nut solids is important, it appears that the ability to effectively hydrate these nut solids primarily affects peanut flavor intensity. Indeed, the more uniform the hydration of these nut solids, the more intense will be the perceived peanut flavor.

Prior efforts to reduce the stickiness perception of peanut butter without adversely affecting peanut flavor intensity have generally been unsuccessful. In the past, there has usually been a trade off between stickiness reduction and peanut flavor intensity, i.e., increases in peanut flavor also increase stickiness and vise versa. For example, chunky type peanut butters made with larger peanut granules have more peanut flavor compared to creamy style peanut butters. However, the processing conditions that create these larger particle size peanut solids generally lead to stickier peanut butters because of increases in viscosity. Conversely, fine grinding of the nut solids (i.e., reducing the particle size) disperses flavor components throughout the nut paste, thus decreasing the flavor impact of these nut solids.

The viscosity of the peanut butter is affected primarily by the particle size distribution (PSD) of the nut solids. Peanut butters made by milling the nut solids to a monomodal particle size distribution have relatively lower viscosities. See U.S. Pat. No. 5,079,207 (Wong et al), issued Jan. 7, 1992 (roll milling nut solids to a monodispersed/monomodal particle size distribution). Conversely, a coarser grind results in a more viscous peanut butter because the nut solids exist in a polymodal particle size distribution, resulting in an increase in particle packing behavior and a greater tendency under stress of the nut particles to collide with each other. Another reason for the higher viscosity of polymodal PSD peanut butters is that coarse grinding of the nuts ruptures fewer oil cells, resulting in less free oil in the nut solid suspension.

To reduce stickiness, the viscosity of the peanut butter needs to be reduced. This can be achieved by increasing the amount of shear imparted to the nut paste and/or decreasing the particle size of the nut solids. A high pressure or multiple pass homogenization of the peanut paste has typically been used to achieve the necessary size reduction and shear. See, for example, U.S. Pat. No. 3,619,207 (Dzurik et al), issued Nov. 9, 1971 which describes one such high pressure homogenization process. Unfortunately, prior attempts to reduce the viscosity of the peanut butter have also led to a significant reduction in peanut flavor intensity. This has been attributed to a reduction in the residence time in the mouth of the mass of ingested peanut butter. This shorter in-mouth residence time decreases the peanut flavor intensity because the solids are hydrated to a lesser extent. In addition, high pressure or multiple pass homogenization often grinds the nut solids to such a fine size that a significant portion of the peanut flavor volatiles originally present are lost.

Another factor affecting consumer acceptability of peanut butter is its grittiness impression. Grittiness occurs when the solid particles in the peanut butter are of a sufficient size and appropriate geometry that the tongue can sense them. Solids that can impart grittiness include not only the peanut solids, but also other non-fat solids that are typically present in the peanut butter, especially water soluble solids such as sugar and salt. One way to reduce this grittiness impression is by simply passing the mixture of peanut paste and other non-fat solids through a high pressure homogenizer to reduce all the solids to a finer size. See U.S. Pat. No. 5,518,755 (Wong et al), issued May 21, 1996. However, as noted before, this also adversely impacts the peanut flavor intensity of the resulting peanut butter because of the size reduction that occurs in the peanut solids.

Accordingly, it would be desirable to be able to formulate a peanut butter that: (1) reduces the stickiness impression; (2) does not adversely affect peanut flavor intensity; and (3) reduces grittiness.

DISCLOSURE OF THE INVENTION

The present invention relates to nut spreads, especially peanut butters, having reduced stickiness, while maintaining desired nut flavor intensity. These nut spreads have a viscosity of about 2000 centipoise or less (measured at 6.8 $\sec^{-1}$) and comprise:

a. from about 25 to about 60% nut solids;
b. at least about 4% added oil;
c. from about 42 to about 60% total fat
d. from about 3.5 to about 25% of a particulate water-soluble component selected from flavorants, flavor enhancers, bulking agents and mixtures thereof;
d. optionally, but preferably a nut butter stabilizer; and
e. optionally, but preferably an emulsifier.

The present invention further relates to a process for making these nut spreads. This process comprises the steps of:

a. forming a mixture consisting essentially of:
   (1) from about 50 to about 90% nut paste;
   (2) at least about 4% added oil;

(3) optionally but preferably from about 3.5 to about 25% particulate water-soluble components selected from flavorants, flavor enhancers, bulking agents and mixtures thereof;

(4) optionally, but preferably a nut butter stabilizer; and (5) optionally, but preferably an emulsifier; and b. high shear mixing the mixture until it has a viscosity of about 2000 centipoise or less (measured at 6.8 sec$^{-1}$).

The nut spreads and especially peanut butters of the present invention have significantly reduced stickiness compared to prior peanut butters. This is achieved by greatly reducing the viscosity of the nut spread, i.e., to about 2000 centipoise or less. This viscosity reduction is obtained by a combination of two factors: (1) adding oil over and above that normally present in the peanut paste; and (2) high shear mixing this mixture of peanut paste and added oil until the indicated viscosity is obtained. The greatly reduced viscosity of the nut spreads of the present invention means significantly less work has to be imparted to the ingested nut spread mass in order to shear thin it and make it easy to swallow. This is perceived as a reduction in stickiness of the nut spread.

DETAILED DESCRIPTION OF THE INVENTION

A. Definitions

As used herein, the term "nut spread" means a spreadable food product made primarily from nut solids and fat/oil, plus other ingredient such as nut butter stabilizers, flavorants, flavor enhancers, bulking agents, emulsifiers, etc. Nut spreads include, but are not limited to, "nut butters and "peanut butters" as these terms are defined by the standards of identity of the Food and Drug Administration.

As used herein, the term "total fat" refers to the total amount of fat and oil present in the nut spread. While the terms "fat" and "oil" are used somewhat interchangeably, the term "fat" usually refers to triglycerides (and their corresponding substitutes) that are solid or plastic at ambient temperature, while the term "oil" usually refers to triglycerides (and their corresponding substitutes) that are liquid or fluid at ambient temperature.

B. Nut Solids, Nut Paste and Fats/Oils

A primary ingredient of the nut spreads according to the present invention are the nut solids that are derived from nuts and oil seeds. While the present invention will be often be described in terms of nut solids derived from peanuts, it should be understood that other sources of nut solids such as almonds, pecans, walnuts, cashews, filberts, macadamia nuts, Brazilians, hazel nuts, sunflower seeds, sesame seeds, pumpkin seeds and soybeans can be used as well. Mixtures of these nut solids can also be used.

The flavor of the nut paste can be that of the natural (raw) nut or is more typically developed by subjecting the nuts to a thermal operation, usually roasting. For example, peanuts can be roasted in a hot air convection roaster (e.g., a Jet Zone roaster manufactured by Wolverine). The flavor character and intensity are controlled by the roast temperature and the roast time.

Generally, roasting peanuts at a higher roast temperature and shorter time has resulted in the most desirable peanut flavor. However, there is a limit to the amount of peanut flavor that can be developed by this approach. Roasting peanuts at higher temperatures cause a non-uniform temperature profile and in turn a non-uniform flavor profile within the peanut. It is this non-uniformity in flavor (darker roast outside and lighter roast inside) that creates a more desirable peanut flavor relative to peanuts roasted to the same color but at a lower roast temperature. However, because of the non-uniform roasting profile within the peanut, roasting to a darker roast color to further intensify peanut flavor can cause over-roasting of the outer peanut to occur, leading to burnt notes.

A way to intensify peanut flavor while minimizing burnt notes caused by over-roasting is to combine peanuts roasted separately to various roast colors. It was discovered that a combination of light and dark roasted peanuts resulted in a more intense and preferred peanut flavor character. The combination of a light and dark roast fraction simulates the flavor profile developed within a peanut that is roasted at high roast temperatures. This flavor profile can be easily manipulated by varying the proportion of peanuts roasted to different roast colors. Moreover, peanut flavor perception can also be manipulated by controlling the grind size of the various roasted peanut fractions. For example, peanuts roasted to a darker roast color can be milled to a very fine particle size without losing its flavor because of the low volatility of the flavors generated during roasting. Conversely, peanuts roasted to a lighter color should be milled to a larger particle size because of the high volatility of the flavors generated during roasting.

The nut spreads according to the prevent invention comprise from about 25 to about 60% nut solids, preferably from about 35 to about 55% nut solids; most preferably from about 40 to about 50% nut solids. These nut solids are typically dispersed or suspended in oil derived from the respective nut that is commonly referred to as a "nut paste." The nut paste can be made by comminuting nuts using any conventional grinder such as Bauer mill, Urschel or Fitmill that provides an oil continuous suspension and reduces the viscosity of the paste. These nut pastes typically have a bimodal particle size distribution, i.e., .the nut solids form two different particle distribution curves that overlap.

A key aspect of the nut spreads of the present invention is that they contain added oil. As used herein, "added oil" means that the nut spreads contain additional oil over and that is normally expressed from the nut during paste formation. The purpose of this added oil is to reduce the viscosity of the nut spread, especially after the nut spread has been processed as described hereafter. The nut spreads of the present invention contain at least about 4% (preferably at least about 5%) added oil. Typically, the amount of added oil is in the range of from about 4 to about 12%, preferably from about 5 to about 7%.

The added oil used in the nut spreads is typically that which is naturally naturally expressed from the nut or seed, such as during the formation of a nut paste. However, oils such as soybean oil, palm oil, cottonseed oil, coconut oil, walnut oil and other suitable edible oils can also be used, in whole or in part, as the added oil in making the nut spreads of the present invention. Preferably, peanut oil expressed during formation of the peanut paste is the primary added oil used in making peanut butters according to the present invention. For nut spreads made from other nuts and oil seeds, such as the sunflower seeds, mixtures of oils can be preferred for flavor.

Low calorie and zero calorie oil substitutes, such as sucrose polyesters of long chain fatty acid (olestra) and other polyol polyesters of fatty acids, can be used as the added oil in making these nut spreads. See, for example, U.S. Pat. No. 3,600,186 (Mattson et al.) issued Aug. 17, 1971; U.S. Pat. No. 5,422,131 (Elsen et al), issued Jun. 6, 1995; U.S. Pat. No. 5,419,925 (Seiden et al), issued May 30, 1995; U.S. Pat. No. 5,071,669 (Seiden), issued Dec. 10, 1991, all of which are incorporated by reference. Mixed triglycerides made from medium and long chain saturated and/or unsaturated fatty acids can also be used as the added oil herein. See, for example, U.S. Pat. No. 5,288,512 (Seiden), issued Feb. 22, 1994, which is incorporated by reference. Oils that contain medium chain triglycerides can also be used be used as the added oil source. See U.S. Pat. No. 4,863,753 (Hunter et al), issued Sep. 5, 1989, which is incorporated by reference.

The total fat present (i.e., that obtained during comminution of the nuts plus added oil) in the nut spreads of the present invention can vary widely depending upon the viscosity desired, the fat level desired and like factors. If desired, the total fat present can be such as to satisfy the standard of identify for nut spreads, such as peanut butter. Nut spreads of the present invention typically comprise from about 42 to about 60% total fat. Nut spreads of the present invention preferably comprise from about 45 to about 55%, most preferably from about 48 to about 53%, total fat.

C. Water-Soluble Solids

The nut spreads of the present invention also comprise from about 3.5 to about 25%, preferably from about 5 to about 10%, water-soluble solid components. These water water-soluble solids can be selected from flavorants, flavor enhancers, bulking agents, as well as mixtures thereof.

As used herein, the term "flavorant" refers to agents that contribute to the flavor of the nut spread. These include sweeteners, natural and artificial flavors, and other flavorants that contribute to the flavor of the nut spread, including natural or artificial peanut flavors, roasted flavors, praline/carmel flavors, walnut flavors, almond flavors and flavor compositions. Sweeteners can be selected from sugars, sugar mixtures, artificial sweeteners and other naturally sweet materials. Sugars include, for example, sucrose, fructose, dextrose, honey, high fructose corn syrup, lactose, maltose, and maltose syrups. Preferably, the sweetener will have a sweetness intensity the same or similar to that of sucrose or fructose. Sugars are typically included in the nut spreads of the present invention at a level of from about 0.5 to about 10%, preferably from about 1 to about 7%.

Artificial sweeteners such as aspartame, acesulfam, saccharine, cyclamate and glycerrhizin can also be used in the nut spreads of the present invention. The amount of artificial sweetener used depends on its sweetness intensity. Typically, these artificial sweeteners are included in amount that provides a sweetness intensity equivalent to the addition of from about 0.5 to about 10%, preferably from about 1% to about 7%, sucrose. Usually from about 0.001% to about 2% artificial sweetener is used.

As used herein, "flavor enhancers" refer to agents that enhance or complement the flavor of the nut spread. Flavor enhancers include salt or salt substitutes such as sodium chloride, potassium chloride, sodium chloride/potassium chloride mixtures, and seasoned salts. The level of flavor enhancer used is a matter of the desired taste level, but usually is from about 0.1 to about 2%, preferably from about 0.5 to about 1.5%, of the nut spread.

The nut spreads of the present invention can also comprise from about 0.01% to about 0.02% citric acid as a flavor enhancer. Preferably from about 0.01% to 0.015% citric acid is used. The addition of citric acid can enhance the roasted nut and especially the roasted peanut butter flavor and saltiness impression, thereby reducing the amount of salt required to give the nuts spreads, especially peanut butters, of the present invention an acceptable flavor. The addition of citric acid, especially in the presence of a metallic ion salt, also allows the nut spread to achieve oxidative stability through chelation of the metal ions by the citric acid.

Particularly preferred flavor systems for use in the nut spreads of the present invention are those involving a combination of sugar and salt. For nut spreads using this preferred flavor system, the sugar is typically present in the spread at a level from about 0.5 to about 10%, preferably from about 1 to about 7%; the level of salt is typically present in the spread at a level of from about 0.1 to about 2%, preferably from about 1 to about 1.5%.

Water soluble bulking agents can also be used in the nut spreads of the present invention. These bulking agents typically add body or texture to the spread and can be non-nutritive or low calorie materials. Suitable bulking agents include corn syrup solids, maltodextrin, dextrose, polydextrose, mono- and disaccharides, starches (e.g., corn, potato, tapioca wheat), as well as mixtures of these agents. Corn syrup solids, polydextrose (from Pfizer Chemicals) and maltodextrin are preferred bulking agents. Sugar substitutes which function like sugars but which are non-nutritive can also be used herein. Such sugar substitutes include the 5-C-hydroxyalkylaldohexoses described in U.S. Pat. No. 5,041,541 (Mazur), issued Aug. 20, 1991.

In order to minimize grittiness, these water-soluble solids preferably have a relatively free particle size. Water soluble solids included in the nut spreads of the present invention typically have a mean particle size of about 20 microns or less. Especially preferred water soluble solids have a mean particle size of about 10 microns or less.

D. Other Solids

Nut spreads of the present invention can comprise solids other than nut solids and water soluble solids. These other solids can be present in the nut spreads of the present in combined amounts of up to about 20%, preferably up to about 10%. These other solids can include fibers, such as cellulose, flours (e.g., wheat, rye, pea) and protein supplements such as additional peanut solids, soy flour, soy concentrate, soy isolate, casein, egg whites, and protein from other animal or vegetable sources; or any combination thereof.

E. Nut Butter Stabilizers and Emulsifiers

The nut spreads of the present invention can also optionally but preferably comprise a nut butter stabilizer in effective amounts up to about 5%. Preferably from about 1 to about 3% nut butter stabilizer is used. These nut butter stabilizers can be any of the known peanut butter stabilizers, for example, hydrogenated rapeseed oil, or other hydrogenated triglycerides having a high proportion of $C_{20}$ and $C_{22}$ fatty acids. See for example, U.S. Pat. No. 3,265,507 (Japikse), issued Aug. 9, 1966 and U.S. Pat. No. 3,129,102 (Sanders), issued Apr. 14, 1964), which are incorporated by reference. These stabilizers are usually triglycerides which are solid at room temperature. They solidify in the nut spread in specific crystalline states and keep the oil from separating. These materials can be mixed with a second hydrogenated oil having an iodine value of less than 8, for example hydrogenated palm oil, canola oil, soybean oil, rapeseed oil, cottonseed oil, coconut oil, and similar materials. This stabilizer can also be mixed with lower melting fat fractions as, for example, the peanut butter stabilizer composition disclosed in U.S. Pat. No. 4,341,814 (McCoy), issued Jul. 27, 1982, which is incorporated by reference.

Particularly suitable nut butter stabilizers for nut spreads of the present invention include tailored β' stable hardstocks referred to as "PSP/PSS" hardstocks, as disclosed in U.S. Pat. No. 4,996,074 (Seiden et al), issued Feb. 26, 1991, which is incorporated herein by reference. Highly hydrogenated high erucic acid rapeseed oil shown in Example VI of this patent is an example of a β' tending hardstock particularly suitable for use in combination with the PSP/PSS hardstock. When the PSP/PSS hardstock is used in combination with highly hydrogenated (Iodine Value less than 20, preferably less than 10) high erucic acid (preferably at least about 40%) rapeseed oil, it should be used in ratios of PSP/PSS hardstock:high erucic acid rapeseed oil of from about 30:1 to about 10:1, preferably from about 27:1 to about 20:1. The high erucic acid rapeseed oil is more fully discussed in this patent at column 7, line 50 to column 8, line 14.

Emulsifier can also be used in the nut spreads of the present invention to achieve the proper texture. The emulsifier can be any food compatible emulsifier such as mono- and di-glycerides, lecithin, sucrose monoesters, polyglycerol esters, sorbitan esters, polyethoxylated glycols and mixtures thereof. Up to about 5% and, preferably from about 0.1 to about 3% emulsifier is used.

F. Other Optional Components

Nut chunks (including defatted nut chunks), flavored or candied bits and other optional components can be included in the nut spreads of the present invention at various levels. These other components include chocolate chips or bits of other flavored bits, e.g., butterscotch and peanuts, jellies (either low calorie jellies or regular jelly or preserves), and praline nuts or other candies. These other components are usually included at levels up to about 20% of the nut spread.

G. Preparation of Nut Spread

The nut spreads of the present invention are typically prepared by starting with a mixture of the nut paste and the added oil that is usually deposited into a mixing tank. The nut paste comprises from about 50 to about 90%, preferably from about 55 to about 85%, most preferably from about 60 to about 83% of the mixture. The other nut spread ingredients (e.g., water soluble solids such as sugar and salt, bulking agents such as corn syrup solids, protein solids, stabilizer, and emulsifier) are also preferably mixed, added, blended, or otherwise combined together with this mixture of nut paste and added oil. It can be desirable to add the water-soluble solids first, followed by the protein solids (i.e., soy protein), particularly when making a crunchy peanut spread. This keeps the protein from hydrating and/or denaturing and causing a higher viscosity spread.

After the nut paste and added oil, plus any of the other nut spread ingredients, have been mixed, added, blended or otherwise combined together, the mixture is then typically passed through a high pressure homogenizer to reduce the grittiness of the mixture. See U.S. Pat. No. 4,352,573 (Pandolfe), issued Oct. 5, 1982 and U.S. Pat. No. 4,383,769 (Pandolfe), issued May 17, 1983 (herein incorporated by reference) for suitable high pressure homogenizers made by APV Gaulin. Typically, this homogenization step is carried out a pressure of from about 3000 to about 5000 psi.

The mixture, with or without homogenization, is then subjected to high shear mixing to reduce its viscosity. Suitable devices for high shear mixing include colloid mills (e.g., Greerco colloid mill, Fryma colloid mills) and high shear dispersers (Silverson, IKA). This mixture of nut paste and added oil, plus any remaining nut spread ingredients, is subjected to high shear mixing, until the mixture has a viscosity of about 2000 centipoise or less, preferably about 1800 centipoise or less, most preferably about 1500 centipoise or less.

After high shear mixing, the nut spread is then finished by passing it through a deaerator (versator) and a scraped wall heat exchanger to increase the oxidative stability of the nut spread and to set up its crystalline structure. The scraped wall heat exchanger is typically operated such that the freezer outlet temperature is between 97° F. (36° C.) and 100° F. (38° C.). Chunks or pieces of nuts can also be added to the finished spread at this point if desired.

Nut spreads prepared according to this process can have monomodal or preferably bimodal particle size distribution. See U.S. Pat. No. 5,508,057 (Wong et al), issued Apr. 16, 1996 (herein incorporated by reference) that discloses a process for obtaining a monomodal particle size distribution by high pressure homogenization. Spreads having a monomodal particle size distribution have a more creamy texture and lower stickiness, but with lower flavor intensity. Spreads having a bimodal particle size distribution have higher nut flavor intensities. Nut spreads prepared according to this process will further have a viscosity of about 2000 centipoise or less, preferably about 1800 centipoise or less, most preferably about 1500 centipoise or less, and a Casson yield value of less than about 50 dynes/cm$^2$, preferably less than about 30 dynes/cm$^2$. The Casson plastic viscosity of these spread is typically less than about 10 poise, preferably less than about 5 poise.

ANALYTICAL TEST METHODS

1. Viscosity and Casson Yield Value of Nut Pastes and Nut Spreads

A Brookfield Viscometer (HAT series), 5C4-13R chamber with a 8C4-27 spindle is used. This arrangement consists of a spindle "bob" of 0.465 inches (1.12 cm). The inner diameter of the sample cell is 0.750 inches (1.87 cm). The instrument is calibrated at 65° C. (149° F.) and all samples are measured at 65° C. (149° F.).

A sample of 14.0 grams of the nut spread or nut paste (unaerated) is placed in the sample cell. The sample cell is then inserted in the jacketed cell holder. To compensate for heat losses through the tubings, etc., the water temperature entering the jacketed cell holder should be a few degrees higher than the desired sample temperature of 65° C. (149° F.). After the temperature of the sample has reached 65° C. (149° F.) the sample is pre-sheared for five minutes at 50 rpm. The speed is then changed to 100 rpm and a measurement taken after the dial reading settles to a constant value. A total of five scale readings are recorded for 100, 50, 20, 10 and 5 rpm. In general, the time before reading should be as set forth in Table I.

TABLE 1

| RPM | Time Before Reading (Seconds) |
| --- | --- |
| 100 | 3 |
| 50 | 6 |
| 20 | 15 |
| 10 | 30 |
| 5 | 60 |

The dial reading and rpm are converted into shear stress and shear rate values by multiplying the rpm and dial reading by 0.34 and 17, respectively. A plot of the square root of shear stress vs. the square root of shear rate results in a straight line. Readings where the dial pointer goes off scale are ignored. A least squares linear regression is made over the data to calculate the slope and intercept.

This data is used to calculate two values. The first of these is the plastic viscosity which is equal to the slope of the line squared. The plastic viscosity is a measurement of the viscosity of the nut spread/nut paste at an infinite shear rate. It accurately predicts the resistance to flow in pumping, moving or mixing situations. The Casson plastic viscosity is measured in poise.

The second value is the yield value which is equal to the value of the x intercept (abscissa) squared. The yield value is a measure of amount of force or shear that is necessary to get the nut spread/nut paste to start moving. The yield value is measured in dynes/cm$^2$. The relationship between the plastic viscosity and the yield value determine how a nut spread/nut paste will behave in additional processing.

2. Particle Size Analysis

A Malvern 2600D particle size analyzer with an IBM PS/2 computer was used to analyze the particle size of the samples. A small amount (about 0.01 grams) of its sample was placed in a 25 ml test tube and about 15 ml of acetone are added to it. The sample is dispersed in the acetone by using a vortex mixer. A transfer pipette is then used to add this diluted solution dropwise to the acetone filled cell of the analyzer. The sample is added until the obscuration is 0.2 to 0.3. The obscuration refers to the amount of light which is obscured by the sample because of diffraction and absorption. The instrument reads more accurately when the obscuration is 0.05 to 0.5 and preferably from 0.2 to 0.3 (20% to 30% of the light energy is reduced).

The apparatus is fitted with a 100 mm lens to determine the particle size of the paste or spread. Particle sizes from 0.5 to 188 microns can be measured using a 100 mm lens. A magnetic stirrer is used to insure that the sample is being dispersed during the readings. Each sample is swept 250 times by the laser for each reading. Each sample was read a minimum of three times with a five (5) minute wait between each reading.

EXAMPLES

The following are representative examples of peanut butters and spreads prepared according to the present invention.

Example 1

Peanut butter is prepared from the following total ingredient formulation:

| Ingredients | Wt. % |
| --- | --- |
| Peanuts | 83.9 |
| Sugar | 5.8 |
| Peanut Oil | 6.45 |
| Salt | 1.2 |
| Molasses | 0.5 |
| Stabilizer* | 1.85 |
| Emulsifier (mono and diglycerides of palmitic and stearic acids) | 0.3 |

*Hardened rapeseed oil blended with hydrogenated soybean oil

The peanuts are roasted at 422° F. (217° C.), blanched and ground in a Bauer Mill to form a peanut paste. The peanut paste (335.6 lbs) is then deposited into a 100 gallon Hamilton kettle. The molasses, stabilizer, emulsifier and peanut oil are added to the mixing tank which is held at a constant temperature of 150° F. (65.6° C.). The remaining solid ingredients (corn syrup solids, salt and sugar) are then added to the paste mix and the entire mixture is then stirred for about another 30 minutes.

After mixing of all of the ingredients is completed, the mixture is pumped through a Gaulin M-3 homogenizer at 5000 psig and then through a W-500 H Colloid Mill. The resulting homogenized, milled mixture has an apparent viscosity of less than 1500 centipoise and contains solids having a mean particle size of 10.5 microns. This homogenized, milled mixture is then processed through a deaerator (versator) and a scraped wall heat exchanger to increase the oxidative stability of the peanut spread and to set up its crystalline structure. The scraped wall heat exchanger is operated such that the freezer outlet temperature is between 97° F. (36° C.) and 100° F. (38° C.). Chunks or pieces of nuts can also be added to the finished peanut butter at this point if desired.

Example 2

A peanut spread is made from the following ingredient formulation:

| Ingredients | Wt. % |
| --- | --- |
| Peanuts | 60.0 |
| Sugar | 5.8 |
| Peanut Oil | 12.0 |
| Salt | 1.2 |
| Molasses | 0.5 |
| Corn Syrup Solids | 18.35 |
| Stabilizer* | 1.85 |
| Emulsifier (mono and diglycerides of palmitic and stearic acids) | 0.3 |

*Same as Example 1

The peanuts are roasted at 422 F (217° C.), blanched and ground in a Bauer Mill to form a peanut paste. The peanut paste (240 lbs) is then deposited into a 100 gallon Hamilton kettle. The molasses, stabilizer, emulsifier and peanut oil are added to the mixing tank which is held at a constant temperature of 150° F. (65.6° C.). The remaining solid ingredients (corn syrup solids, salt and sugar) are weighed (101.4 lbs) into a Hobart Mixing Bowl. The solids are mixed at low speed for 15 minutes and then loaded into a K-Tron T-35 Twin Screw feeder positioned over the mixing tank.

The solid ingredients in the feeder are then added to the mixing tank at a constant rate over a time period of 50 minutes (feed rate of 120 lbs/hour). Throughout the time that the solids are being added to the mixing tank, a portion of the tank mixture is pumped through a Gaulin M-3 homogenizer (operated at a pressure of 7000 psig), then into a heat exchanger, and finally into a Greerco W-500 H Colloid Mill. When all of the solid ingredients from the feeder have been added to the mixing tank, the mixture in the tank is recycled through the homogenizer, colloid mill and heat exchanger for another 30 minutes. The resulting homogenized, milled mixture has an apparent viscosity that is less than 1500 centipoise and contains solids having a mean particle size of 10.5 microns. This homogenized, milled mixture is then processed through a deaerator (versator) and a scraped wall heat exchanger to increase the oxidative stability of the peanut spread and to set up its crystalline structure. The scraped wall heat exchanger is operated such that the freezer outlet temperature is between 97° F. (36° C.) and 100° F. (38° C.). Chunks or pieces of nuts can also be added to the finished peanut butter at this point if desired.

What is claimed is:

1. A process for making a nut spread, which comprises the steps of:
   a. forming a mixture consists essentially of:
      (1) from about 50 to about 90% nut paste;
      (2) at least about 4% added oil; and
   b. high shear mixing the mixture until it has a viscosity measured at 6.8 sec$^{-1}$ of about 2000 centipoise or less.

2. The process of claim 1 wherein the mixture of step (a) comprises from about 55 to about 85% nut paste and from about 4 to about 12% added oil.

3. The process of claim 1 wherein the mixture of step (a) further comprises from about 3.5 to about 25% of a particulate water-soluble component selected from the group consisting of flavorants, flavor enhancers, bulking agents and mixtures thereof.

4. The process of claim 3 which comprises the further step of passing the mixture of step (a) through a homogenizer at a pressure of from about 3000 to about 5000 psi prior to step (b).

5. The process of claim 3 wherein the nut paste is peanut paste and wherein the added oil is peanut oil.

6. The process of claim 5 wherein the mixture of step (a) comprises from about 0.5 to about 10% sugar and from about 0.1 to about 2% salt.

7. The process of claim 6 wherein the mixture of step (a) is high shear mixed during step (b) until it has a viscosity measured at 6.8 $\sec^{-1}$ of about 1800 centipoise or less, a Casson yield value of less than about 50 dynes/$cm^2$, and a Casson plastic viscosity of less than about 10 poise.

8. The process of claim 7 wherein the mixture of step (a) is high shear mixed during step (b) until it has a viscosity measured at 6.8 $\sec^{-1}$ of about 1500 centipoise or less, a Casson yield value of less than about 30 dynes/$cm^2$, and a Casson plastic viscosity of less than about 5 poise.

* * * * *